(12) United States Patent
Liu

(10) Patent No.: US 7,882,569 B2
(45) Date of Patent: Feb. 8, 2011

(54) SEAMLESS SWIMSUIT

(76) Inventor: Yaming Liu, East No. 38 Longgang Rd., Nanning Village, Taihe Town, Baiyun District, Guangzhou, Guangdong (CN) 510445

( * ) Notice: Subject to any disclaimer, the term of this patent is extended or adjusted under 35 U.S.C. 154(b) by 76 days.

(21) Appl. No.: 12/033,464

(22) Filed: Feb. 19, 2008

(65) Prior Publication Data

US 2009/0205099 A1 Aug. 20, 2009

(51) Int. Cl.
*A41D 5/00* (2006.01)
(52) U.S. Cl. .................. 2/67; 2/274; 2/275; 2/243.1
(58) Field of Classification Search .............. 2/67, 2/69, 1, 274, 275, 243.1
See application file for complete search history.

(56) References Cited

U.S. PATENT DOCUMENTS

| | | | | |
|---|---|---|---|---|
| 3,766,566 A | * | 10/1973 | Tadokoro | 2/275 |
| 4,404,243 A | * | 9/1983 | Terpay | 428/62 |
| 4,775,581 A | * | 10/1988 | Siniscalchi | 442/149 |
| 5,406,646 A | * | 4/1995 | Balit et al. | 2/67 |
| 5,478,278 A | * | 12/1995 | Greenblatt | 450/32 |
| 5,586,340 A | * | 12/1996 | Russo | 2/67 |
| 6,582,412 B2 | * | 6/2003 | Christoffel et al. | 604/385.01 |
| 6,837,771 B2 | * | 1/2005 | Falla | 450/39 |

* cited by examiner

*Primary Examiner*—Gloria Hale
(74) *Attorney, Agent, or Firm*—Global IP Services; Tianhua Gu

(57) ABSTRACT

A swimsuit without thread sewn seams includes a front portion, a back portion and a bonding structure connecting the joint of the front portion and the back portion. The bonding structure comprises that a glue layer is disposed between said fundus material and the joint of the front portion and the back portion. The elastomer set in the bra cup, the front portion, the fundus material and the steel circle are connected by solid glue. The present invention provides a swimsuit without patchwork. The steel circle is embedded in the swimsuit to make it comfortable and beautiful.

10 Claims, 5 Drawing Sheets

SEAMLESS SWIMSUIT

FIELD OF THE INVENTION

The present invention relates to a swimsuit, and more particularly to a seamless swimsuit constructed without any stitching lines.

BACKGROUND OF THE INVENTION

There is great change on the haunch and, the skin of the haunch extends greatly when a person changes from standing-up to sitting, bowing, and bending. The lap line of a conventional swimsuit is instable because the lap line lies the site of the skin flexes maximally on the below half part. As a result, the lap line of the conventional swimsuit will glide up which will cause the entire swimsuit not to touch the body tightly and also make the body uncomfortable. To resolve this problem, China patent 200410035397.4 provides a kind of short pants and swimsuits which are cut out specifically and then made up. However, such technical scheme does not keep the swimsuit close enough to the body and the structure is not fluent since it's complex in working procedure on cutting and sewing.

Moreover, the bra on the swimsuit usually adopts an item of steel circle to support the breast and set cavum for filling in gasket. However, the gasket may move relatively and displace, thus make the swimsuit unlovely and uncomfortable to wear.

SUMMARY OF THE INVENTION

A main object of the present invention is to provide a seamless swimsuit. The swimsuit is made without any suture or patchwork. Preferably, the steel circle and gasket are integrated in the swimsuit as a whole.

Accordingly, in order to achieve the above object, the present invention provides a seamless swimsuit comprising, a front portion; and a back portion connected with the front portion; wherein said front portion and said back portion are connected using a connecting material by glue. Said connecting material is welded between the front portion and the back portion by ultrasonic method.

Preferably, a glue layer is disposed between the connecting material and the joint of the front portion and the back portion. Said glue layer is preferably composed of polyurethane.

Preferably, the front portion and the back portion each are provided with two buttons. Each of the buttons is connected with an adjustable aiguillette. Two identical bras are symmetrically disposed on the front portion of the swimsuit by heating press technology. An elastomer is connected with each bra body, with one surface being connected with the front portion and another surface connected with the fundus material. Said elastomer is an object which is thick in the center and thin around the margin. The front portion, back portion, elastomer and fundus material are all connected together via glue.

The front portion, back portion and fundus material are all warp-knitted fabric. There is no suture or patchwork used in the swimsuit. Thus, during the construction of the swimsuit, traditional sewing machine is unnecessary. Additionally, the present invention makes the swimsuit comfortable to wear.

DETAILED DESCRIPTION OF PREFERALBE EMBODIMENTS

Figure 1:
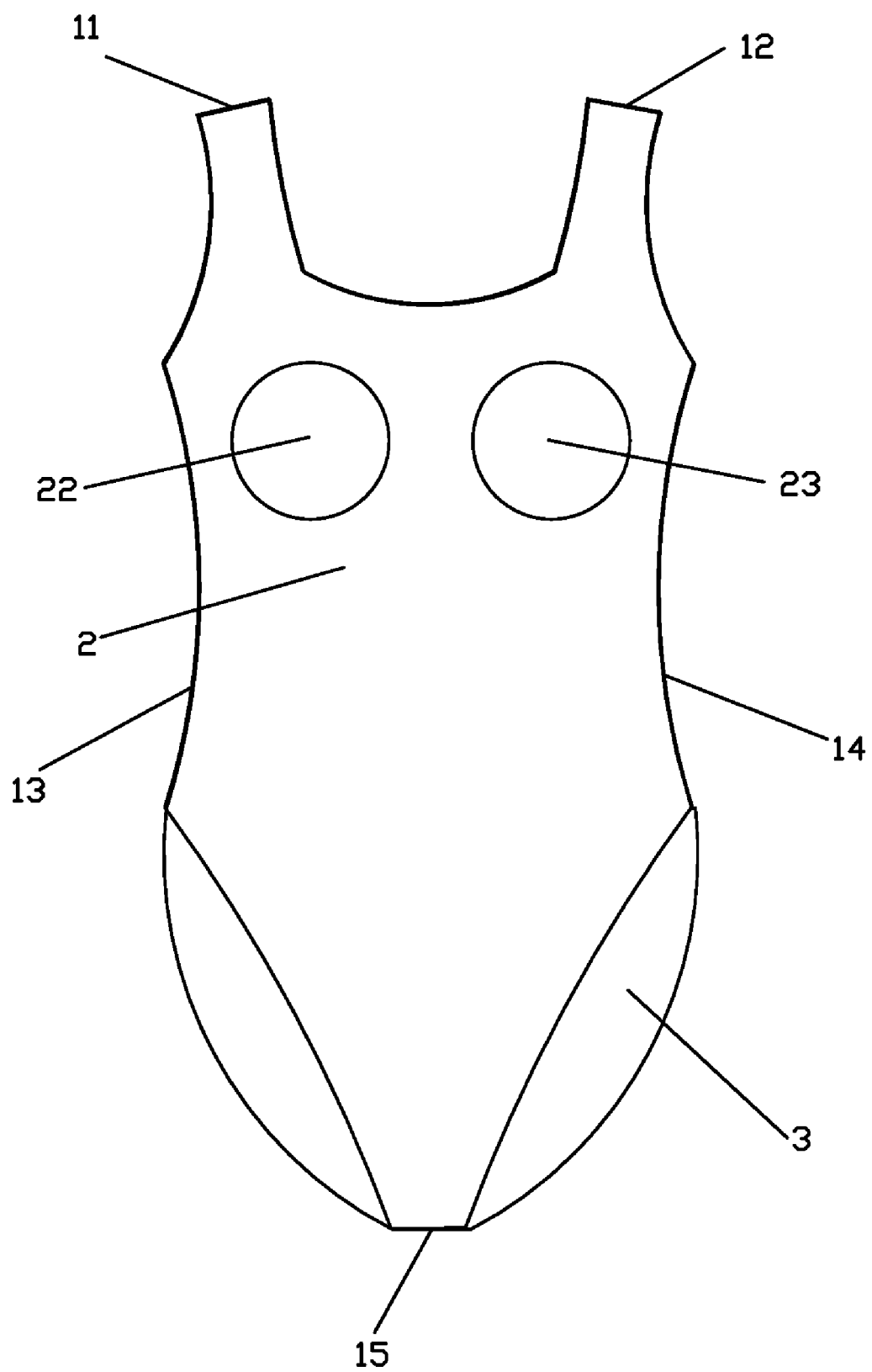
FIG. 1 illustrates the structure of the seamless swimsuit in a first example of the present invention.
Figure 2:
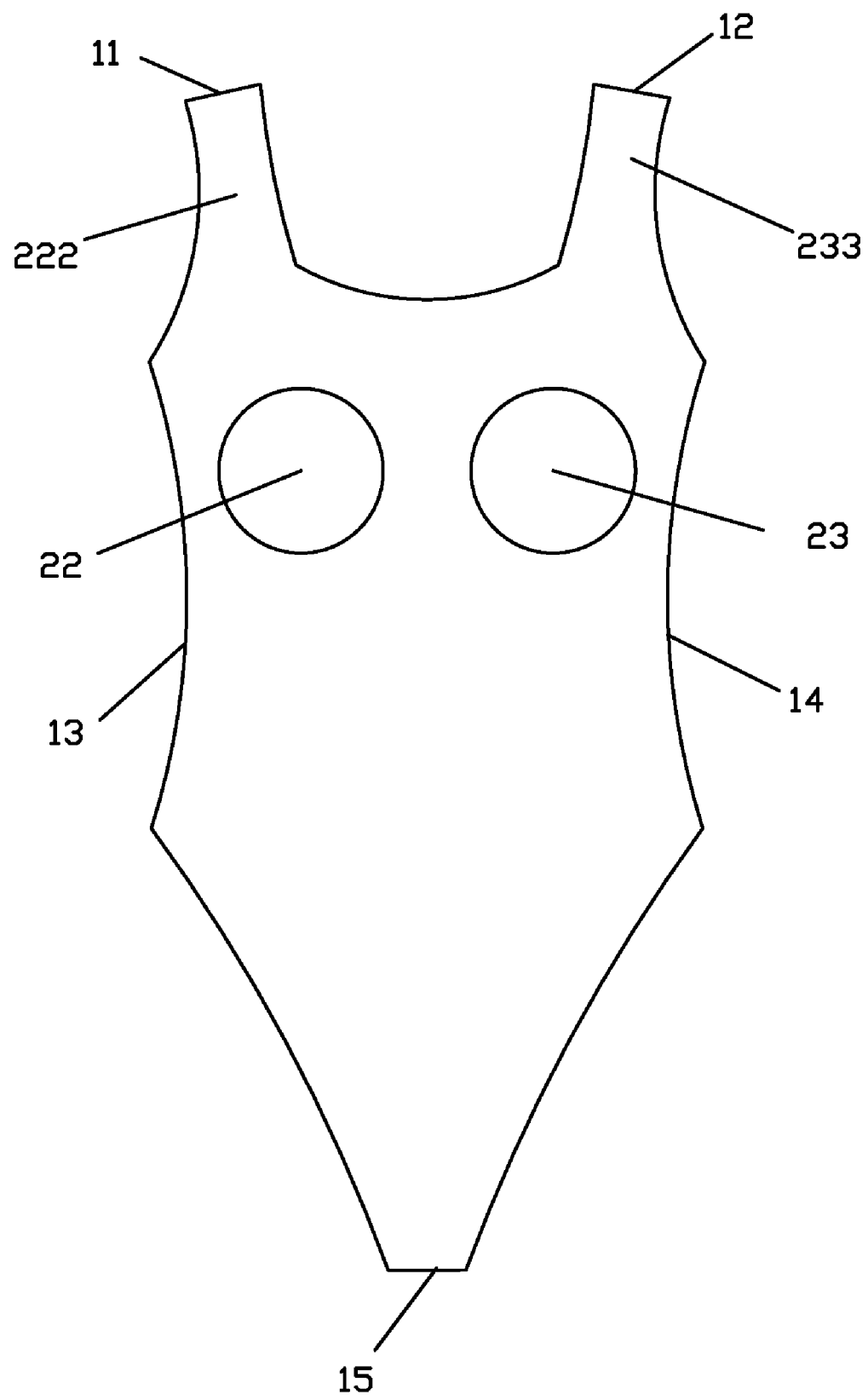
FIG. 2 illustrates the front portion of the swimsuit in FIG. 1.
Figure 3:
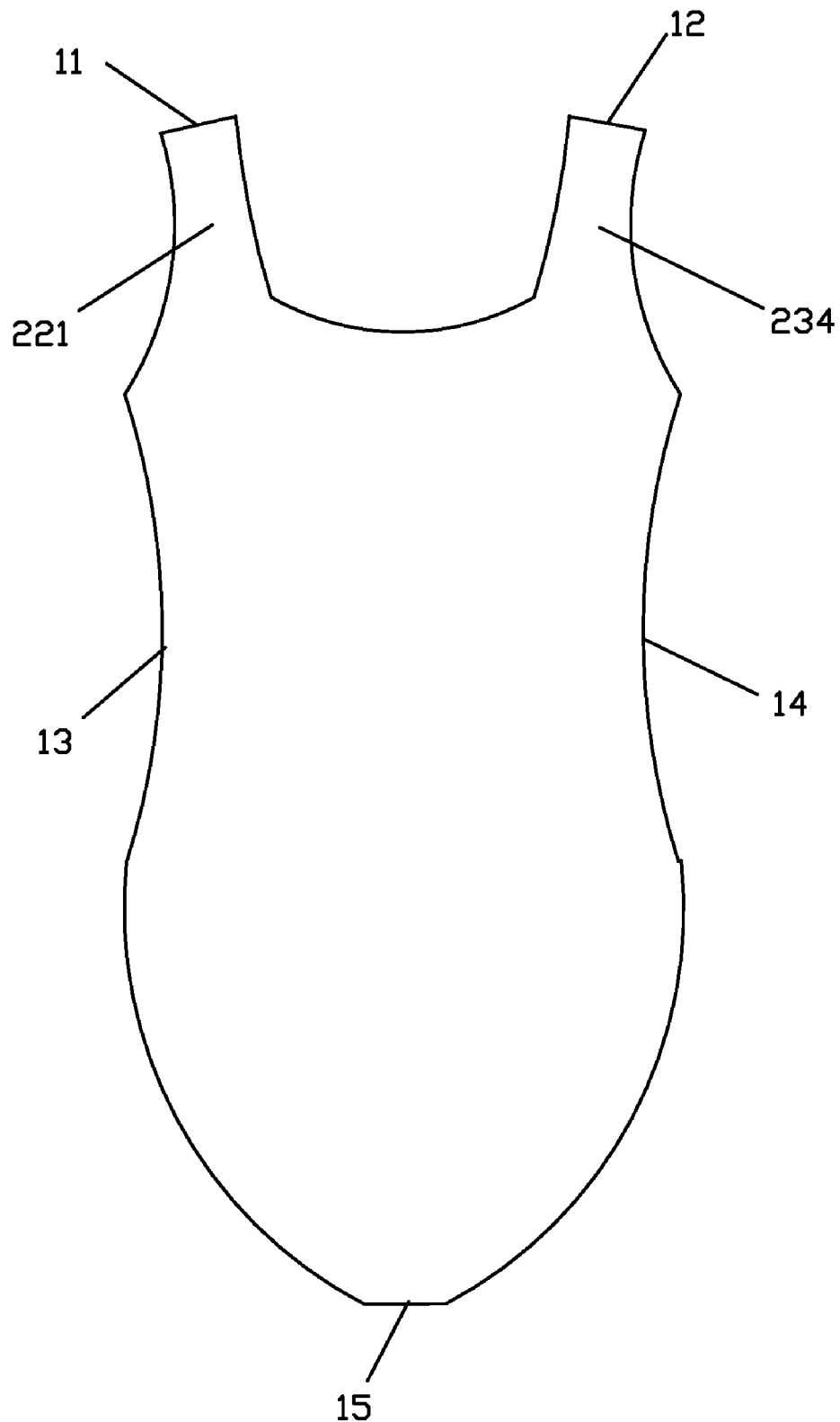
FIG. 3 illustrates the back portion of the swimsuit in FIG. 2.

Referring now to FIG. 1-3, a seamless swimsuit according to a first example of the present invention is illustrated. The seamless swimsuit comprises a front portion 2 and a back portion 3 both of which are cut out by ultrasonic. There are bra cups 22 and 23 on the front portion 2, and the cups are of the same shape and structure and symmetrically located on the front portion 2. Two strips 222 and 233 extend from the front portion 2. Likewise, there are two another strips 221 and 234 extending from the back portion 3.

The strip 222 on the front portion 2 and the strip 221 on the back pane 3 bind to each other via a joint material using solid glue (with a Trade name BaiMeiTie®). The connection site is illustrated as sideline 11 wherein the glue can also be polyurethane. The strip 233 of the front portion 2 and the strip 234 of the back portion 3 are bonded to the sideline 12 in the same way. Likewise, the front portion 2 and the back portion 3 are connected with each other along the sideline 13, 14 and 15 in the same way.

Figure 4:
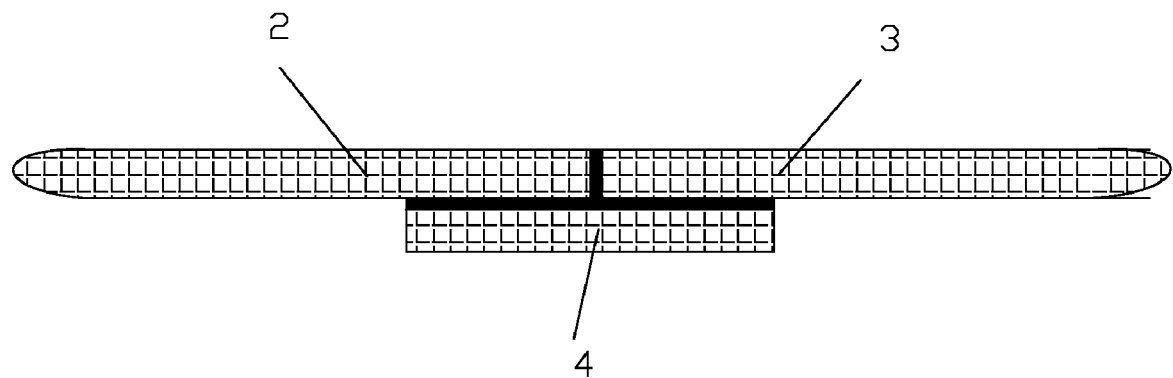
FIG. 4 illustrates the section plane of the joint of the front portion and the back portion.

Referring to FIG. 4, a fundus material 4 is placed at the connection site of the front portion 2 and the back portion 3, and the two portions are connected with each other via the material 4. The front portion 2 and the back portion 3 are molded by ultrasonic according to three dimension mould and then bonded to the fundus material 4 by glue. After pressed by heat and jointed by ultrasonic, the swimsuit is made.

Figure 5:
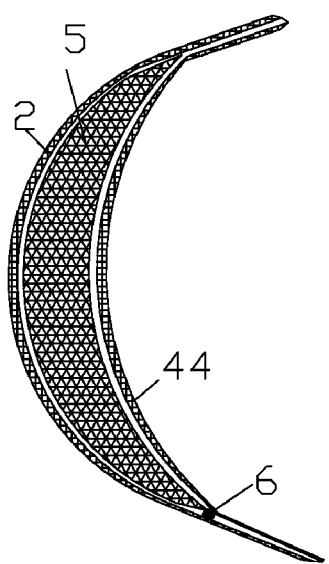
FIG. 5 illustrates the section plane of the bra body of the swimsuit in FIG. 1.

The structure of the bra cup on the front portion 2 is illustrated in FIG. 5. The bra cup 22 (or 23) comprises an elastomer 5 conglutinated with the front portion 2, a fundus material 44 conglutinated with the elastomer 5 but not conglutinated with the front portion 2 and a steel circle 6 with a shape illustrated in FIG. 6. The front portion 2, elastomer 5, steel circle 6 and fundus material 44 are all linked by the gluewater named Spain 9400#.

The elastomer 5 is designed according to the rule of the body engineering and is cut by ultrasonic to a bra cup which is thick in the center but thin in the margin. The elastomer 5 has favorable elasticity and breathability. The bra cup 22 or 23 on the front portion 2 is made in accordance with the following steps: Firstly, the elastomer 5 and the steel circle 6 are conglutinated by the gluewater to a surface of the bra cup heated pressed on the front portion 2; Secondly, the fundus material 44 is conglutinated by the gluewater to another surface of the bra cup; Lastly, the elastomer 5, the steel circle 6 and the fundus material 44 are heat pressed to form a whole bra.

Figure 6:
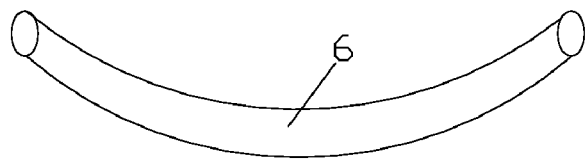
FIG. 6 illustrates the steel circle shown in FIG. 5.
Figure 7:
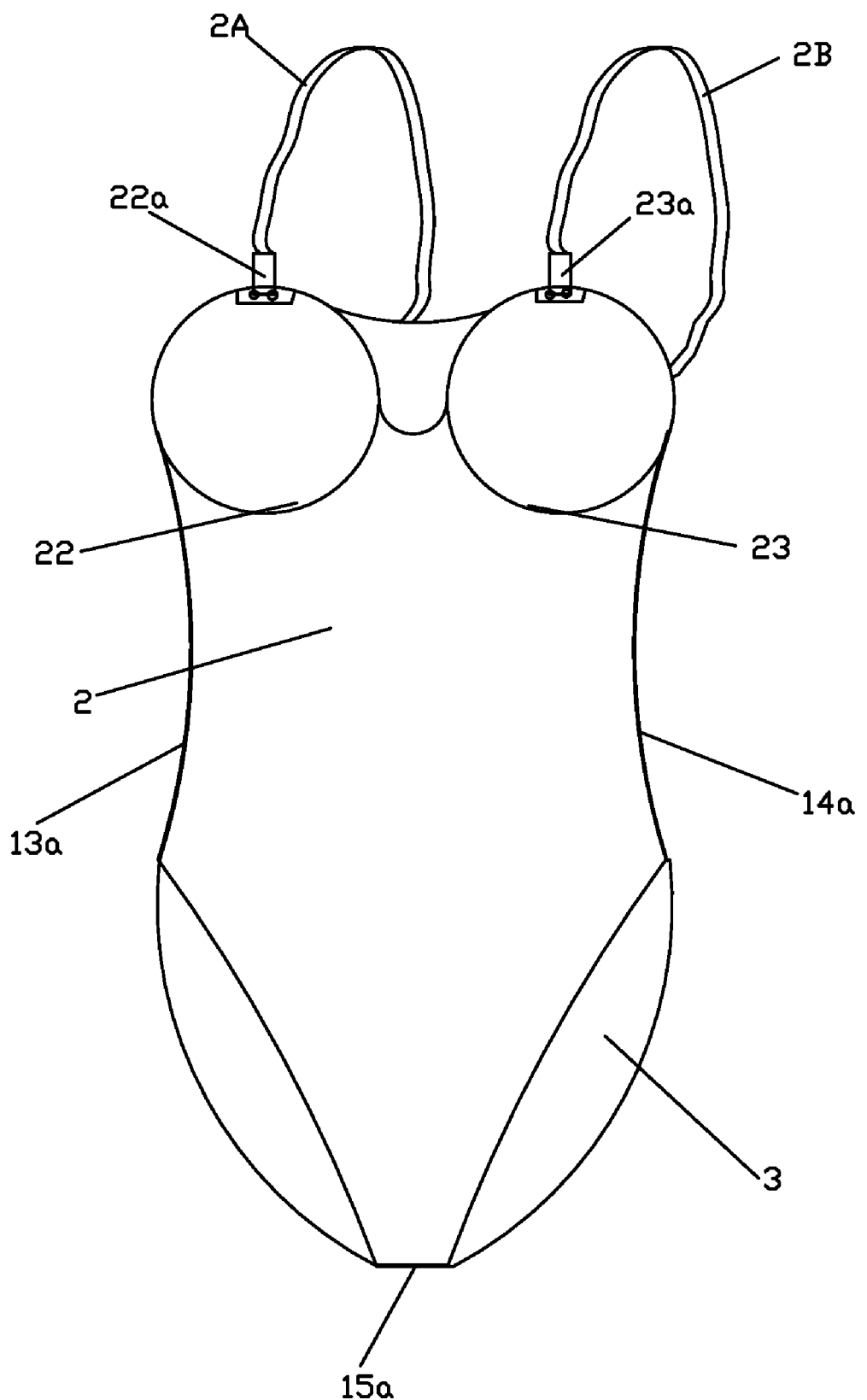
FIG. 7 illustrates the structure of the seamless swimsuit in the second example.

FIG. 6 shows another embodiment of the seamless swimsuit of the present invention. The bra cup 22 and 23 and the linkage of the front portion 2 and the back portion 3 are the same as the first example shown in FIG. 1-5. The difference is that the bra 22 and 23 on the front portion 2 are provided with back button 22a and 23a. The back portion 3 is provided with back button 32b and 33b. The back buttons 22a and 32b are connected together by strip 2A. The back button 23a and 33b are connected by strip 2B. The front portion 2 and the back portion 3 are jointed along 13a, 14a and 15a illustrated as FIG. 6 by joint material.

The front portion 2, the back portion 3, the fundus material 44 and the joint material can all be made of warp-knitted super thin lycra or the warp-knitted brocade spandex. The preferable composition is brocade 80% and spandex 20%. Also, the front portion 2, the back portion 3, the fundus material 44 and the joint material can be made by superfine warp-knitted Lycra.

The seamless swimsuit of the two examples according to the present invention can be also used in the swimsuit for man and the straitjacket or the like. For example, the swimsuit for man comprises the front portion, the back portion and the fundus material joint with the inner surface of the front portion and the back portion, and both of which are connected by ultrasonic jointing. Any equivalent changes to the present invention will fall within the range of the present invention.

What is claimed is:

1. A swimsuit without thread sewn seams comprising:
   a front portion and a back portion cut out by ultrasonic;
   said front portion and said back portion being bonded by a fundus material and glue;
   corresponding portion sides of the front and back portions being aimed at each other and put together without overlap to form a seam, the fundus material is put along the seam to stick the two potions together by glue on back sides of the two portions, the glue is spread between the two portions and the fundus material;
   the fundus material being made of warp-knitted elasticity material.

2. The swimsuit of claim 1, wherein said bonding is ultrasonic bonding.

3. The swimsuit of claim 2, wherein the glue comprising polyurethane is disposed between the fundus material and a joint place of the front portion and the back portion.

4. The swimsuit of claim 1, wherein said front portion and back portion each is provided with button holes, two buttons are attached to said front portion and back portion respectively via the button holes.

5. The swimsuit of claim 4, wherein each of said buttons is connected with a frog closure.

6. The swimsuit of claim 1, wherein each of said bra cups comprises a bra cup body and a fundus material, with an elastomer and a steel circle sandwiched between the bra body and the fundus material, the steel circle is built into the underside of the bra cup body, the elastomer and the steel circle are conglutinated by the gluewater to a surface of the bra cup and are bonded on the front portion by thermal compression.

7. The swimsuit of claim 6, wherein said elastomer diminishes thickness from center to periphery.

8. The swimsuit of claim 6, wherein the bra cups body and the elastomer, as well as the elastomer and the fundus material are bonded by glue comprising polyurethane.

9. The seamless swimsuit of claim 1, wherein said front portion, said back portion and said fundus material are all made of warp-knitted brocade spandex or warp-knitted super thin spandex.

10. The swimsuit of claim 9, wherein a composition of the warp-knitted brocade spandex is brocade 80% and spandex 20%.

* * * * *